US012386683B2

(12) United States Patent
Shomron et al.

(10) Patent No.: US 12,386,683 B2
(45) Date of Patent: Aug. 12, 2025

(54) NON-BLOCKING SIMULTANEOUS MULTITHREADING (NB-SMT)

(71) Applicant: Technion Research and Development Foundation Ltd., Haifa (IL)

(72) Inventors: Gil Shomron, Got Levin (IL); Uri Weiser, Tel Aviv (IL)

(73) Assignee: Technion Research and Development Foundation Ltd., Haifa (IL)

( * ) Notice: Subject to any disclaimer, the term of this patent is extended or adjusted under 35 U.S.C. 154(b) by 680 days.

(21) Appl. No.: 17/447,065

(22) Filed: Sep. 8, 2021

(65) Prior Publication Data

US 2022/0075669 A1    Mar. 10, 2022

Related U.S. Application Data

(60) Provisional application No. 63/075,737, filed on Sep. 8, 2020.

(51) Int. Cl.
*G06F 9/52* (2006.01)
*G06F 9/38* (2018.01)
*G06N 3/04* (2023.01)

(52) U.S. Cl.
CPC ............... *G06F 9/524* (2013.01); *G06F 9/38* (2013.01); *G06N 3/04* (2013.01)

(58) Field of Classification Search
None
See application file for complete search history.

(56) References Cited

U.S. PATENT DOCUMENTS

| 9,818,059 | B1* | 11/2017 | Woo ........................ G06N 3/045 |
| 2016/0358070 | A1* | 12/2016 | Brothers ................. G06N 3/082 |
| 2018/0315159 | A1* | 11/2018 | Ould-Ahmed-Vall ....................... G06N 3/063 |
| 2019/0303749 | A1* | 10/2019 | Appuswamy ............. G06F 5/01 |
| 2020/0218962 | A1* | 7/2020 | Lee ......................... G06N 3/063 |
| 2020/0320375 | A1* | 10/2020 | Abuhatzera ............ G06N 3/045 |

FOREIGN PATENT DOCUMENTS

WO    WO-2020190772 A1 *   9/2020

OTHER PUBLICATIONS

Faraone, Julian, Nicholas Fraser, Giulio Gambardella, Michaela Blott, and Philip HW Leong. "Compressing Low Precision Deep Neural Networks Using Sparsity-Induced Regularization in Ternary Networks." arXiv preprint arXiv:1709.06262 (2017). (Year: 2017).*
M. H. Mofrad, R. Melhem, Y. Ahmad and M. Hammoud, "Multithreaded Layer-wise Training of Sparse Deep Neural Networks using Compressed Sparse Column," 2019 IEEE High Performance Extreme Computing Conference (HPEC), Waltham, MA, USA, 2019, pp. 1-6. (Year: 2019).*

* cited by examiner

*Primary Examiner* — Frank D Mills
(74) *Attorney, Agent, or Firm* — Reches Patents

(57) ABSTRACT

A method for non-blocking multithreading, the method may include (a) providing, during a deep neural network (DNN) calculation iteration, to a shared computational resource, input information units related to multiple DNN threads; (b) determining whether to reduce a numerical precision of one or more DNN calculations related to at least one of the multiple DNN threads, and (c) executing, based on the determining, DNN calculations on at least some of the input information units to provide one or more results of the DNN processing.

23 Claims, 8 Drawing Sheets

NON-BLOCKING SIMULTANEOUS MULTITHREADING (NB-SMT)

I. BACKGROUND

Deep neural networks (DNNs) are built of layers that primarily perform dot product operations between activations and weights. These basic operations are at the core of DNNs that achieve state-of-the-art results in different domains. Yet, DNNs comprise abundant computations; for example, state-of-the-art convolutional neural networks (CNNs) may require billions of multiply-and-accumulate (MAC) operations to classify a single image. Their great potential and computational burden have been a fertile ground for research and development of efficient DNN hardware accelerators over the last decade.

The control flow of DNNs is mostly predictable, yet computations are still executed inefficiently on underlying hardware. For example, DNNs may consist of many zero-valued activations and weights. During inference, a layer output is usually followed by a ReLU activation function, which clamps negative activation values to zero. In addition, static pruning techniques push the limits of model sparsity by zeroing out insignificant weights. Zeros can be also found in finer granularities; a quantized 8-bit DNN has many values that can be effectively represented only by the 4-bit least-significant bits (LSBs). This unstructured sparsity can be leveraged to increase efficiency, thereby improving performance and reducing energy. Until now, DNN accelerators have handled such inefficiencies with compressed encodings, output zero-value prediction, input zero-value skipping, and working with bit-serial schemes.

II. BRIEF DESCRIPTION OF THE DRAWINGS

The embodiments of the disclosure will be understood and appreciated more fully from the following detailed description, taken in conjunction with the drawings in which.

Figure 9:
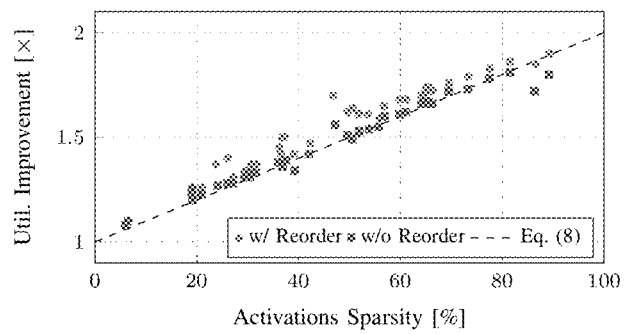
Figure 10:
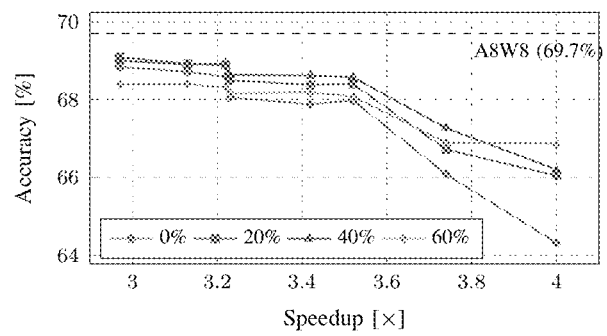

FIG. 9 illustrates an example of GoogLeNet utilization improvement due to SySMTas a function of sparsity, with and without statistical data reordering. Each dot represents a layer; and FIG. 10 illustrates an example of ResNet-18 accuracy versus 4T SySMT speedup with different percentage of pruned weights. Each dot represents a measurement with additional layer tuned to run with two threads.

III. DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions. Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Inspired by conventional CPU simultaneous multithreading (SMT) that increases computer resource utilization by sharing them across several threads, we propose non-blocking SMT (NB-SMT) designated for DNN accelerators.

Like conventional SMT, NB-SMT shares hardware resources among several execution flows. Yet, unlike SMT, NB-SMT is non-blocking, as it handles structural hazards by exploiting the algorithmic resiliency of DNNs.

Instead of opportunistically dispatching instructions while they wait in a reservation station for available hardware, NB-SMT temporarily reduces the computation precision to accommodate all threads at once, enabling a non-blocking operation.

We demonstrate NB-SMT applicability using SySMT, an NB-SMT-enabled output-stationary systolic array (OS-SA). Compared with a conventional OS-SA, a 2-threaded SySMT consumes 1.4× the area and delivers 2× speedup with 33% energy savings and less than 1% accuracy degradation of state-of-the-art CNNs with ImageNet.

A 4-threaded SySMT consumes 2.5× the area and delivers, for example, 3.4× speedup and 39% energy savings with 1% accuracy degradation of 40%-pruned ResNet-18.

In this paper, we introduce non-blocking simultaneous multithreading (NB-SMT), a new approach to tackle sparsity and increase hardware efficiency. Conceptually, NB-SMT is based on the well-known SMT used to concurrently execute multiple instruction flows on shared resources.

In the same manner that SMT keeps several hardware threads to increase utilization of hardware resources, we propose maintaining a number of "DNN threads" that run in parallel so as to increase utilization of DNN hardware resources.

Conventional SMT dispatches instructions to an execution unit in an opportunistic manner. That is, if instruction dependencies are met and its needed resources are available, it will be executed; otherwise, the instruction will wait in a reservation station.

The NB-SMT scheme employed in this paper avoids this online scheduling by "squeezing" two (or more) threads together to the shared resource (e.g., execution unit) by temporarily reducing their numerical precision. By doing so, we (1) leverage DNN tolerance to reduced numerical precision, thereby enabling a non-blocking operation; (2) do not break the systematic operation of DNNs, thereby enabling implementation of SMT in dataflow architectures, which are popular as DNN accelerators; and (3) achieve a speedup that is directly proportional to the number of threads.

NB-SMT may be implemented in different DNN accelerator architectures and can support concurrent execution of threads that originate from different models or from within the same model. In this paper, we focus on the latter and demonstrate 2-threaded and 4-threaded NB-SMT as an extension to an 8-bit output-stationary (OS) systolic array (SA) for matrix multiplication, which we named SySMT.

Compared with the conventional OS-SA, a 2-threaded SySMT achieves a 2× speedup with 33% energy reduction and less than 1% accuracy degradation of state-of-the-art CNNs with a 1.4× area increase. As for 4-threads, we observe that some layers contribute more errors to inference than others when executed with NB-SMT.

Therefore, we trade speedup for accuracy by decreasing the number of running threads in selective layers. Given a 1% accuracy degradation cap, a 4-threaded SySMT delivers, for example, 3.4× speedup with 37% energy reduction and 2.5× area increase with 40%-pruned ResNet-18, compared with the conventional OS-SA.

Our contributions in this paper are as follows:

We introduce the concept of non-blocking simultaneous multithreading (NB-SMT), which increases DNN hardware utilization by exploiting DNN algorithmic resiliency and unstructured sparsity. Specifically, we present an NB-SMT scheme in which the non-blocking operation is enabled by reducing the numerical precision of values on-the-fly. By not blocking any thread, NB-SMT achieves a speedup that is directly proportional to the number of threads.

We demonstrate NB-SMT applicability using SySMT, which is an NB-SMT-enabled output-stationary systolic array. We describe different resource sharing strategies in which SySMT employs both MAC unit and output register sharing.

We evaluate a 2-threaded and a 4-threaded SySMT in terms of speedup, area, power, energy, and model accuracy with various state-of-the-art CNN models and the ImageNet dataset.

The rest of this paper is organized as follows: Section III describes the rationale behind NB-SMT, Section III presents the basic principals of NB-SMT, Section III-D demonstrates NB-SMT as an extension to an output-stationary systolic array (SySMT), Section III-G3 evaluates the impact of NB-SMT on SySMT implementation as well as on model accuracy, Section III-I discusses the applicability of NB-SMT in other accelerators and reviews related work, and Section III-I concludes.

The CPU instruction pipeline faces many challenges in achieving efficient execution. These inefficiencies, also known as hazards, originate from the application's dynamic execution flow and from the generality of the architecture (i.e., general-purpose).

DNNs, on the other hand, work in a systematic, layer-by-layer fashion, with mostly MAC operations taking place during inference, making their control and data flow deterministic; which and how many computations will be conducted, what is the model's memory footprint, where are weights stored, and where will activations be stored during execution, can all be deduced prior to execution (neglecting special cases of conditional DNNs, for example).

Yet, DNNs still exhibit inefficiencies when considering the actual values that propagate through the layers.

Sparsity. DNNs comprise zero-valued activations and weights. Zero-valued activations are produced dynamically during inference, due, among other things, to the popular use of the ReLU activation function, which clamps negative values to zero.

On the other hand, weights are static during inference, and in most cases, not many of them are zero-valued when trained only with a loss function. However, training the network with L1 regularization or pruning the network, for example, can substantially reduce the number of parameters (i.e., increase the number of zero-valued weights) with negligible decrease in model accuracy.

For example, 60% of ResNet-50 parameters can be discarded by iteratively trimming small weights and retraining the model in an unstructured manner.

Partial Sparsity.

Zeros can be also observed when looking within the numerical representation.

DNN tensors usually follow a bell-shaped distribution, such as Gaussian or Laplace. Therefore, when considering a quantized DNN, some values will only be represented by a portion of the LSBs, leaving the most-significant bits (MSBs) to be equal to zero.

Throughout this paper we use 8-bit model representations, so by "partial sparsity" we refer to those numbers that can be represented solely by 4 bits.

Unstructured sparsity. Activation sparsity is unstructured by nature, as the zero-valued activations may be scattered without any confined structure.

Moreover, the values themselves are input-dependent, and thereby dynamic.

Weights, on the other hand, are static during inference and therefore can be pruned either in an unstructured or structured manner.

A general rule of thumb is that unstructured pruning techniques achieve a better parameter reduction to accuracy reduction ratio than do structured techniques. Indeed, with unstructured pruning, the algorithm has the freedom to cancel parameters in weight granularity, whereas structured pruning algorithms are constrained to remove parameters in larger granularity, such as channels or filters.

The downside of unstructured pruning is, however, that it is not easily exploited by hardware.

Figure 1:
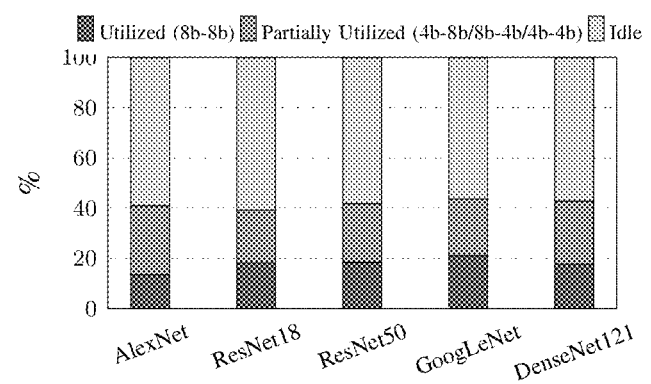
FIG. 1 illustrates an example of a utilization of MAC units.

The unstructured sparse inputs cause spontaneous under-utilization of the MAC units. From a hardware perspective, a MAC unit with one of its inputs equals to zero is practically idle; and an 8b-8b MAC unit with an effective input data-width of 4 bits is only partially utilized. FIG. 1 presents the average MAC utilization of five popular CNN models. We observe that, on average, 60% of MAC operations result in idle MAC units, since one of their inputs is zero-valued; 20% of MAC operations partially utilize the MAC units, since one of their inputs, or both, are effectively represented with 4 bits; and in a mere 10% of the time, the MAC operations fully utilize the MAC units. To increase hardware utilization, we propose non-blocking simultaneous multithreading (NB-SMT) that exploits both the unstructured sparsities of the activations and weights, as well as DNN tolerance to numerical precision reduction.

Algorithmic resiliency. DNNs are fault-tolerant; they can absorb connection removals and numerical precision reduction with only a "graceful degradation" in performance. For example, DNNs can be quantized from FP32 to INT8 in a straight-forward post-training min-max uniform quantization with no significant loss in accuracy. DNN tolerance can be harnessed in order to ease design constraints. Specifically, NB-SMT builds upon DNN resiliency to handle structural hazards without stalling any thread, as opposed to conventional SMT. Avoiding stalls coalesces with the way DNNs operate during inference.

Systematic operation. Inference with DNNs is a compute-intensive task that requires minor control. For example, ResNet-50 requires 4 billion MAC operations to classify a single 224×224 colored image from the ImageNet dataset. During these 4 billion computations, there is not a single control branch—the entire control flow is predictable. These application characteristics have driven computer architects to design highly parallel DNN architectures with almost no control logic. The lack of control capabilities, which is a consequence of the systematic operation of DNNs, stands in contrast to the conventional SMT way of operation, which may stall threads as a function of the current state of microarchitecture. By completely avoiding stalls, we enable an SMT implementation in DNN hardware architectures.

Conventional SMT is based on the observation that a single thread might not fully utilize the execution resources. SMT tries to increase utilization by exploiting thread-level parallelism, that is, dispatching instructions from different threads to the same resources. Inspired by SMT, we propose NB-SMT, a special "SMT" designated for the environment of DNNs.

NB-SMT is conceptually similar to traditional SMT, in the sense that the context of more than one thread is kept on hardware in parallel. In all other aspects, however, NB-SMT differs from traditional SMT: first, it compensates for under-utilization caused by particular data values; and second, it is non-blocking. The exact NB-SMT implementation may vary, depending on the underlying architecture and target DNNs. In this paper, since we target quantized neural networks, instead of keeping operations waiting in reservation stations on structural hazards, NB-SMT "squeezes" operations to the same hardware by momentarily reducing their precision, considering DNN tolerance to reduction in numerical precision.

A. Hiding Inefficiencies

MAC unit operation is value-dependent. For example, let (X, W) be an input pair that consists of two vectors of length K that are to be multiplied. The process of achieving the result includes K MAC operations of the corresponding elements of X and W, that is, $O=\Sigma_{i=0}^{K-1} x_i w_i$. Now, assume X comprises 50% zero-valued elements. In this case, 50% of MAC operations are effectively redundant, as $0 \times x = 0$ and $0 + x = x$.

NB-SMT increases utilization with additional threads that exploit the idle MAC units. For example, a 2-threaded (2T) NB-SMT will include two independent input pairs $(X, W)_1$ and $(X, W)_2$, each of which will produce a result of its own, $O_1$ and $O_2$, respectively. Thus, if the first pair does not require the MAC unit, there is a chance that the second thread will, thereby utilizing it. To support NB-SMT, the hardware should include additional data path and registers. The hardware should also be capable of handling thread collisions, i.e., cases in which the threads' computation demands are higher than the MAC unit capabilities.

B. Thread Collisions

Thread collisions can be handled with queues and back-pressure to support congestions. However, NB-SMT takes another path, exploiting DNNs' resiliency and temporarily reducing the threads' numerical precision so that execution units are still able to accommodate all thread computations in that same cycle. Thread collision incurs reduction in precision which contributes some error to the overall computation, for example, the case of a single 8b-8b MAC unit and two threads with 8b-8b and 8b-8b input pairs. On the other hand, for example, threads that are represented solely by their 4-bit LSBs can share the underlying MAC unit without affecting the original computation. We demonstrate these scenarios next.

C. Squeezing Them In

Consider a flexible multiplier, capable of conducting either a single 8b-8b multiplication or two 4b-8b multiplications per cycle (we further elaborate on such flexible multipliers in Section III-G1). For simplicity's sake, throughout this section we consider only two threads, that is, two input pairs, $(X, W)_1$ and $(X, W)_2$, with unsigned values.

1) Precision Reduction: On-the-fly precision reduction truncates values represented by more than 4 bits to 4 bits. Reducing thread precision takes place when a thread collision occurs and the thread operands are represented by more than 4 bits. Before reducing the 8-bit value (activation or weight) to 4 bits, we round the number to the nearest integer that is a whole multiple of 16 ($2^4$), to mitigate the noise it contributes to the entire inference pass.

Figure 2:
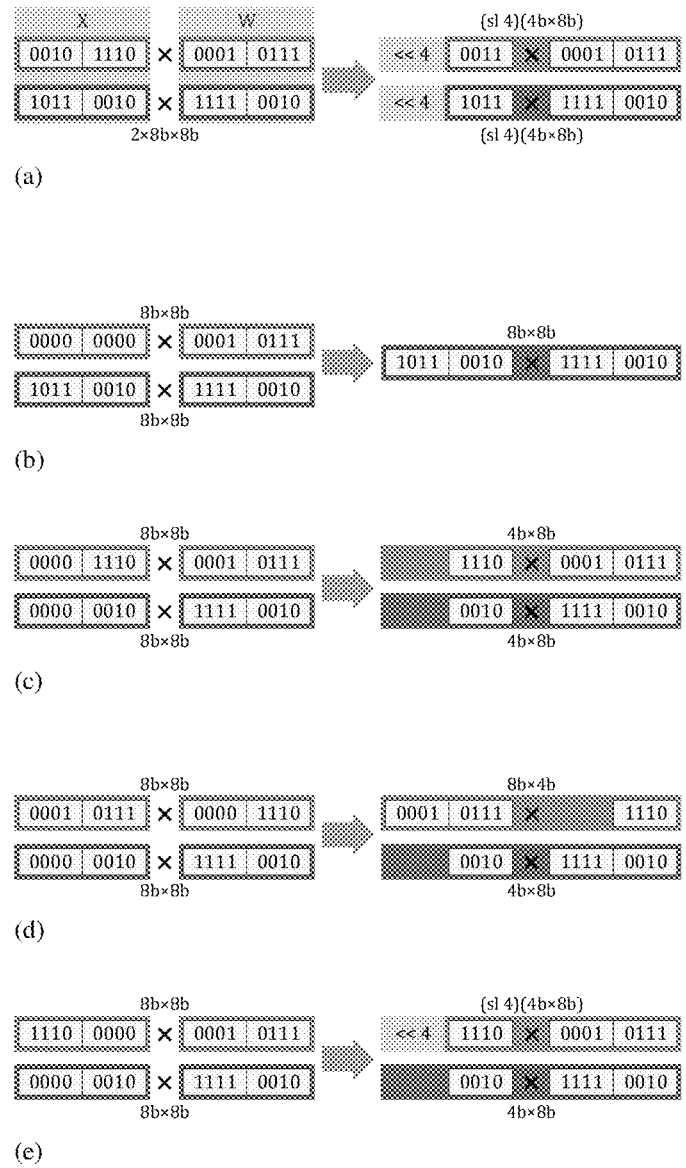
FIG. 2 illustrates an example of Examples of how NB-SMT "squeezes" inputs to a single flexible multiplier unit, capable of either one 8b-8b multiplication or two independent 4b-8b multiplications.

FIG. 2a illustrates an example of reducing the numerical precision of the activation values (without loss in generality). $(X, W)_1$ and $(X, W)_2$ are equal to $(46_{10}, 23_{10})$ and $(178_{10}, 242_{10})$, respectively. Both X inputs MSBs are rounded and truncated so as to be represented by 4-bits, yielding $(3_{10}, 23_{10})$ and $(11_{10}, 242_{10})$, respectively. Two 4b-8b multiplications then take place, followed by a 4-bit shift left, resulting in two approximated results $1104_{10}$ (instead of $1058_{10}$) and $42592_{10}$ (instead of $43076_{10}$). It is obvious, however, that it is unnecessary to reduce precision of all input values.

2) 8-Bit Sparsity: If $X_1$ or $W_1$ or both are zero-valued, $(X, W)_2$ can use the entire 8b-8b multiplier, and vice versa. For example, consider the two input pairs in FIG. 2b, $(0, 23_{10})$ and $(178_{10}, 242_{10})$. It is clear that the first thread does not require the multiplier, since its first multiplication operand is 0. The second thread will, therefore, utilize the entire multiplier to produce the original result with no computation error.

3) 4-Bit Sparsity: If both threads are effectively represented by 4b-8b or 4b-4b, computation error is avoided. Without loss in generality, we consider only the 4-bit representation of X inputs. FIG. 2c illustrates an example of thread collision. The easiest way to solve the collision is simply by considering only the 4-bit MSBs, as described in FIG. 2a. Instead, we observe that in both threads, the four MSB bits are zero-valued. Therefore, instead of trimming the threads' LSBs, we keep them, taking into account that, in this case, multiplication should not be followed by a shift left operation.

4-bit sparsity of both X and W inputs may be exploited as well, as depicted in FIG. 2d. In this example, the X and W of the first thread are swapped. Now, the W input of the first thread uses the LSBs, neglecting the zero-valued 4-bit MSBs. Even though exploiting data-width variability of both inputs seems trivial, additional hardware is required to dynamically determine which of the inputs, X or W, will enter the 4-bit multiplier port.

FIG. 2e illustrates an example in which 4-bit sparsity and precision reductions are needed. In this example, the first and second threads effectively use 8b-8b and 4b-8b, respectively. The precision of the first thread is, therefore, reduced to fit the multiplier. The values in this example lead to, effectively, no collision, since the 4-bit LSBs of the first thread are all zeros. If this was not so, error was contributed by the first thread.

D. Shared Resources

Figure 3:
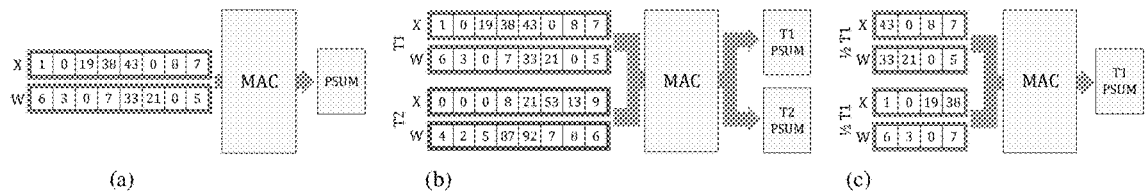
FIG. 3 illustrates an example of shared resources.

NB-SMT can execute several independent threads, i.e., per-thread X, W, and O (FIG. 3b), which is, in a sense, similar to the way conventional SMT operates whereby each hardware thread is executed independently. Logically, however, threads can be dependent, so instead of independent "DNN threads" we propose threads that originate from the same execution flow, somewhat similar to the difference between software threads and processes. By doing so, we can share not only the MAC unit but also additional resources: (1) activation registers sharing: the same activation is used with different weights (filters), thereby computing different output activations; (2) weight registers sharing: the same weight is used with different activations (e.g., batch or another convolution window), thereby computing different output activations; and (3) output registers sharing: different activations and their corresponding weights compute the same output activation.

We focus here on output sharing. Let (X, W) be an input pair that consists of two vectors of length K that are to be multiplied. Obviously, the multiplication result is a scalar equal to $\Sigma_{i=0}^{K-1} x_i w_i$. With 2T NB-SMT, for example, instead of doubling the partial sum registers, we split the input vectors, X and W, between the two threads, and so both thread results are summed up to produce a single scalar value. In other words, given two independent threads, $(X, W)_1$ and $(X, W)_2$, of respective lengths $K_1$ and $K_2$, the outputs are also independent as follows:

$$O_1 = \sum_{i=0}^{K_1-1} x_i^{(1)} w_i^{(1)} \text{ and } O_2 = \sum_{i=0}^{K_2-1} x_2^{(2)} w_i^{(2)}. \quad (1)$$

A single (X, W) input pair may, however, can span two different threads:

Thread 1:$(X[0,K/2-1], W[0,K/2-1])$

Thread 2:$(X[K/2,K-1], W[K/2,K-1])$, (2)

where $G[i_1, i_2]$ denotes an arbitrary vector G, such as X or W, consisting of elements $i_1$ through $i_2$, and, for simplicity's sake, we assume K is an even number. Both threads therefore contribute to the same output as follows (see FIG. 3):

$$O = \sum_{i=0}^{K/2-1} x_i w_i + \sum_{i=K/2}^{K-1} x_i w_i. \quad (3)$$

NB-SMT may be enabled in different DNN hardware architectures. Specifically, we use an output-stationary (OS) systolic array (SA) designated for matrix multiplication as our case study. In this section, we first briefly review SAs. We then describe how data may be organized to decrease the number of thread collisions. And finally, we present the microarchitecture of SySMT—an OS-SA NB-SMT which employs output sharing. Throughout this paper we focus on the computation core.

E. Output-Stationary Systolic Arrays

SAs comprise a grid of processing elements (PEs). PEs work in tandem: each PE independently receives inputs from its upstream PE neighbors, conducts a certain task whose result it stores locally, and forwards its inputs downstream. The well-defined interactions between adjacent PEs and the specific and confined task that each PE conducts enable efficient data reuse and scalability.

SAs serve many applications and come in many shapes and forms. Specifically, we take an SA designated for matrix multiplication and use it for computation of convolutional layers. In addition, we use a variant of SA that is OS. In the OS-SA, each PE receives an activation and weight per cycle and accumulates their multiplication results locally. Data is pushed to the PE array in a skewed manner, so that corresponding activations and weights meet in the appropriate PE. FIG. 5a depicts the OS-SA architecture and PE uarch.

The SySMT grid is almost identical to the conventional SA grid, except that connectivity is scaled with the number of threads, as illustrated in FIG. 5b. In FIG. 3c we illustrate how an input vector is split into two threads; in the same manner, we split the activation and weight input matrices into two threads. Let $X_{M \times K}$ and $W_{K \times N}$ be the two input matrices, and consider a 2-threaded design, for example. Each row in X and each column in W is split as described by Eq. (2). Each PE is therefore able to perform the computation presented in Eq. (3).

F. Data Arrangement

Given two threads, it would be ideal if data was arranged so that in each cycle, one thread holds at least one zero-valued term and the other thread does not, or that both threads hold a pair represented by 4b-8b or 4b-4b. Reordering the data is not, however, trivial: (1) it is impractical to reorder the activation matrices according to their momentary values, since activation values are dynamic; (2) weights are static during inference, but we do not expect the weight tensors to exhibit much correlation between rows as we expect from the activation columns, since each row in the input activations matrix represents a sliding window, and activations are known to exhibit spatial correlation; and (3) the SA structure dictates specific scheduling of the data inputs. Given the two $X_{M \times K}$ and $W_{K \times N}$ input matrices, reordering of X must take place in column granularity followed by reordering of the corresponding W rows accordingly so as to maintain SA data scheduling.

Figure 4:
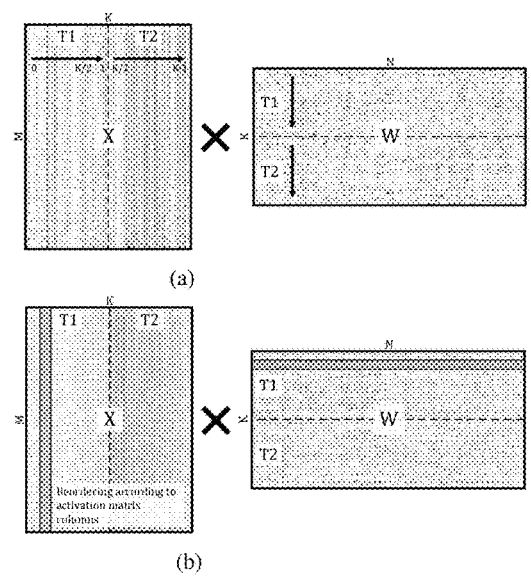
FIG. 4 illustrates an example of an activation and weight tensors from ResNet-18 and ImageNet before and after data arrangement.

Considering these constraints, we reorder the matrices according to per-layer statistics which are gathered once on the activations. Using a random subset of the training set, we log which activation matrix columns are most likely to hold data that is represented by 8-bits. With these statistics in hand, which at this point are static, the activation matrices are rearranged so that an 8-bit activation value from one thread is more likely to be paired with a zero-valued activation from the other thread, and so that a 4-bit activation value from the one thread is paired with another 4-bit activation from the other thread (FIG. 4). In practical terms, during runtime the accelerator will rearrange the layer output according to the pre-determined order for the next layer.

G. PE Microarchitecture

In addition to the circuitry of a conventional OS-SA PE, the SySMT PE requires additional circuitry: (1) flexible multiplier units capable of conducting different precision multiplications on demand; (2) a controller for selecting the right MAC operation as a function of the current input sparsity and/or data width; (3) on-the-fly precision reduction units; and (4) additional output buffers, two per thread (for activation and weight).

Figure 6:
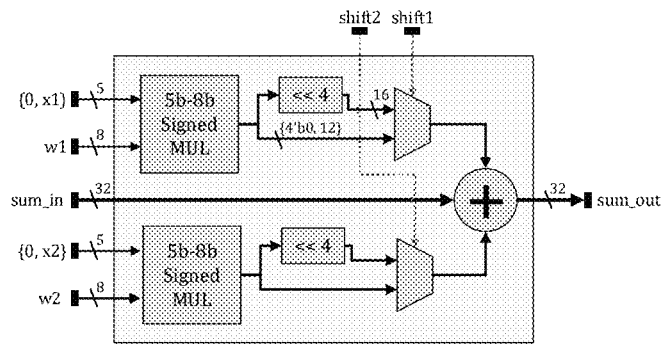
FIG. 6 illustrates an example of a Flexible multiplier (fMUL), capable of either one 8b-8b multiplication or two independent 4b-8b multiplication.

1) Multiplication Decomposition: We use a flexible multiplier unit (fMUL) capable of multiplication decomposition. Consider an 8b-8b multiplier and two 8-bit scalar inputs: activations, $\tilde{x}$, and weights, $\tilde{w}$. We set $\tilde{w}$ to be signed and z to be unsigned, since it is common for activations to follow the ReLU activation function. Multiplication of these two inputs can be formulated as follows:

$$\tilde{x} \cdot \tilde{w} = \sum_{i=0}^{7} 2^i x_i \cdot \tilde{w} = \left( \sum_{i=4}^{7} 2^i x_i + \sum_{i=0}^{3} 2^i x_i \right) \cdot \tilde{w} \quad (4)$$

$$= \left( 2^4 \sum_{i=0}^{3} 2^i x_{i+4} + \sum_{i=0}^{3} 2^i x_i \right) \cdot \tilde{w}$$

$$= ( \ll 4)\underbrace{(\{0, \tilde{x}_{MSB}\} \cdot \tilde{w})}_{5b-8b \text{ sign mult}} + \underbrace{(\{0, \tilde{x}_{LSB}\} \cdot \tilde{w})}_{5b-8b \text{ sign mult}},$$

where we converted $\tilde{x}_{MSB}$ and $\tilde{x}_{LSB}$ into two's complement by adding a zero-valued MSB. This formulation shows that a multiplication of 8-bit unsigned with 8-bit signed can be implemented with two 5b-8b multipliers and a shift. By adding an additional 4-bit shift to the second 5b-8b signed multiplier and control, we achieve a generalized fMUL that is capable of two independent unsigned-signed 4b-8b multiplications or a single unsigned-signed 8b-8b multiplication, as illustrated in FIG. 6. Moreover, a 4b-8b multiplication can be shifted if the original value was approximated using its 4-bit MSBs. For example, consider the case illustrated in FIG. 2e. The multiplier performs a 2×4b-8b multiplication, since the first thread's MSBs are used. Also, notice that the 4-bit MSBs of the first thread are the input to the multiplier, as opposed to the second thread whose 4-bit LSBs are the input to the multiplier. The following multiplication then takes place: $1110_2 \cdot 00010111_2 = 322_{10}$ and $0010_2 \cdot 11110010_2 = 484_{10}$. The first thread computation is followed by a 4-bit shift, which yields a result of $5152_{10} + 484_{10} = 5636_{10}$.

In a similar manner, an 8b-8b multiplication can be formulated as $$\tilde{x} \cdot \tilde{w} = \sum_{i=0}^{7} 2^i x_i \cdot \left( -2^7 w_7 + \sum_{i=0}^{6} 2^i w_i \right) \quad (5)$$

$$= \left( \sum_{i=4}^{7} 2^i x_i + \sum_{i=0}^{3} 2^i x_i \right) \cdot \left( -2^7 w_7 + \sum_{i=4}^{6} 2^i w_i + \sum_{i=0}^{3} 2^i w_i \right)$$

$$= ( \ll 8)\underbrace{(\{0, \tilde{x}_{MSB}\} \cdot \tilde{w}_{MSB})}_{5b-4b \text{ sign mult}} + ( \ll 4)\underbrace{(\tilde{x}_{MSB} \cdot \tilde{w}_{LSB})}_{4b-4b \text{ unsign mult}} +$$

$$( \ll 4)\underbrace{(\{0, \tilde{x}_{LSB}\} \cdot \tilde{w}_{MSB})}_{5b-4b \text{ sign mult}} + \underbrace{(\tilde{x}_{LSB} \cdot \tilde{w}_{LSB})}_{4b-4b \text{ unsign mult}}.$$

The 8b-8b multiplication can be represented as a combination of two 4b-4b unsigned multiplications and two 5b-4b signed multiplications. By adding additional shift logic and control, we can generalize this circuit to be capable of performing either four independent 4b-4b multiplications, two independent 4b-8b multiplications, or one 8b-8b multiplication. The 8b-8b multiplication can be further decomposed or formulated with any other N-bit

---

Algorithm 1 - 2T SySMT PE Logic

Require: Two input pairs, $\{x_0, w_0\}$ and $\{x_1, w_1\}$
Ensure: MAC inputs, $\{\tilde{x}_0, \tilde{w}_0\}$, $\{\tilde{x}_1, \tilde{w}_1\}$, and $\{s_0, s_1\}$
 1: for ∀ cycle do
 2:   if all arguments are non-zero then
 3:     for ∀ thread i do
 4:       if MSBs($x_i$) = 4'b0 then   ▷ 4-bit is suffice -continued Algorithm 1 - 2T SySMT PE Logic

```
 5:        x̃_i ← LSBs(x)
 6:        s_i ← 0
 7:      else                                              ▷ On-the-fly quantization
 8:        x̃_i ← RoundedMSBs(x_i)
 9:        s_i ← 1                                         ▷ Shifted after multiplication
10:      end if
11:      w̃_i ← w_i
12:    end for
13:   else
14:    i ← GetActive Thread({x_0, w_0}, {x_1, w_1})
15:    {x̃_0, w̃_0} ← {LSBs(x_i), w_i}
16:    {x̃_0, w̃_0} ← {MSBs(x_i), w_i}
17:    {s_0, s_1} ← {0, 1}
18:   end if
19: end for
``` input variables. In this paper, however, we only use the two decompositions above, for a 2-threaded and a 4-threaded SySMT.

2) *Local PE Control*: The conventional PE array is highly scalable due to lack of control. Each PE is responsible for a specific task which it conducts locally. Therefore, to keep SySMT as scalable as conventional SAs are, each PE within SySMT should dynamically control its fMUL locally. Algorithm 1 describes how a 2-threaded PE exploits input sparsity and effective data width (of activations, without loss of generality) to prepare the input data and control for the fMUL unit. Each cycle, the PE checks the input computation demands versus its available resources, in this case, an 8b-8b fMAC. If the two threads require the fMAC, the PE checks the data-width of each thread and forwards either its 4-bit MSBs or LSBs. If one of the threads does not require the fMAC, the PE passes the active thread to the fMUL, enabling an error-free 8b-8b multiplication. In either case, the PE sets the corresponding shift signals.

The 4-threaded (4T) implementation considers two more options. When all four threads require the fMAC, all activations and weights precision are reduced to 4 bits according to the effective input data-width of each thread (i.e., MSBs or LSBs). For simplicity's sake, a collision of three threads is treated similarly; that is, we reduce all input precision, even though theoretically one thread can utilize a 4b-8b MAC. Cases of two thread collisions or no collision are handled in the same manner that a 2-threaded SySMT does, but with additional logic that marks the active threads.

Figure 5:
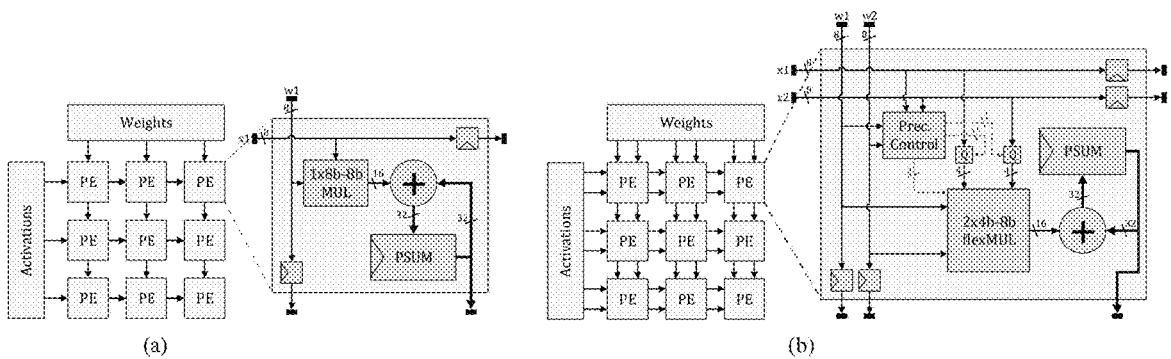
FIG. 5 illustrates an example of an architecture and micro-architecture of a 3×3 OS-SA and SySMT

3) *Putting It All Together*: Enabling NB-SMT does not only require the fMUL (Section III-G1) and the control logic (Section III-G2), but also additional activation and weight output registers and on-the-fly precision reduction logic (FIG. 5). First, the output registers are scaled linearly with the number of threads. Second, to reduce inputs represented by more than 4 bits to 4 bits, we first round them to the nearest integer that is a whole multiple of 16.

SySMT data propagates the same as in conventional SA—each cycle data enters and exits the PEs regardless of the data content. To maintain such systematic non-blocking operation, we trade backpressure by temporarily reducing numerical precision. Moreover, avoiding backpressure yields a constant speedup; a 2-threaded and a 4-threaded SySMT will deliver a speedup of 2× and 4×, respectively. In the next section, we evaluate the impact of SySMT on accuracy as well as on the hardware.

The execution of a DNN layer with two and four threads achieves a constant speedup of 2× and 4×. However, the actual impact of NB-SMT on the underlying hardware, as well as on DNN accuracy, has yet to be evaluated. In Section III-H, we describe our evaluation environment and estimate the hardware area, power, and energy of a 16×16 SySMT; in Section III-I, we present the results of 2T and 4T SySMTs with five popular CNN models.

H. Methodology

*Workloads.* To evaluate SySMT, we use the ILSVRC-2012 dataset with five popular CNN models for image classification, as described in Table I. The models are quantized with a simple 8-bit uniform min-max quantization, using symmetric unsigned quantization for activations and symmetric signed quantization for weights. In addition, activations are quantized per layer, whereas weights are quantized per kernel. This configuration supports an efficient hardware implementation, since each dot product result is multiplied by only two scaling factors: the activations' scaling factor and the corresponding kernel's scaling factor. Prior to CNN execution, we conduct a quick statistics gathering run on 2K randomly picked images from the training set. In this rapid phase, we average the min-max values, correct the batch-norm layers' running mean and running variance, and log the relevant reordering statistics as described in Section III-F; none of these steps involve gradient computation or weight update with gradient descent. In Section III-I, we explore the performance of a 4T SySMT given a pruned network. For weight pruning, we use simple magnitude-based pruning that iteratively prunes a certain percentage of the model weights followed by retraining.

*CNN simulation.* We use PyTorch to simulate the impact of SySMT on the CNN model accuracies. Throughout this section, we do not consider the first convolution layer and the fully-connected layers which we leave intact. The convolution operations are mapped to matrix multiplication operations to fit the hardware simulator.

TABLE I

The evaluated CNN models (FP32 pre-trained from PyTorch). MAC operations are for a single imput image.

|  | Accuracy | | MAC Ops. | |
| --- | --- | --- | --- | --- |
|  | FP32 | INT8 | CONV | FC |
| AlexNet | 56.55% | 56.36% | 0.6 G | 59M |
| ResNet-18 | 69.76% | 69.70% | 1.8 G | 0.5M |
| ResNet-50 | 76.15% | 76.24% | 4.1 G | 2M |
| GoogLeNet | 69.78% | 69.63% | 1.5 G | 1M |
| DenseNet-121 | 74.65% | 74.66% | 2.7 G | 1M |

TABLE II

Design parameters, power, and area breakdown. PE area includes thread registers, control logic, and the MAC unit. MAC units are two-stage pipelines; their areas include the registers.

|  |  | SySMT | |
| --- | --- | --- | --- |
|  | SA | 2T | 4T |
| Array Size | | 16 × 16 PEs | |
| Frequency | | 500 MHz | |
| Technology | | 45 nm | |
| Throughput [GMACS] | 256 | †512 | †1024 |
| Power [mW] @ 80% Util. | 320 | 429 | 723 |
| Total Area [mm$^2$] | 0.220 | 0.317 | 0.545 |
| PE [μm$^2$] | 853 | 1233 | 2122 |
| MAC [μm$^2$] | 591 | 786 | 1102 |

†SySMT throughput is 2× and 4× for 2 and 4 threads, respectively, with on-demand precision reduction.

Hardware evaluation. We implement a 16×16 OS-SA baseline and 16×16 2T and 4T SySMT cores with System-Verilog. Synthesis is performed using Synopsys Design Compiler with the 45 nm NanGate open cell at a clock frequency of 500 MHz. Area and power estimations are extracted from Cadence Innovus. PEs are pipelined internally without affecting the systematic propagation of data between PEs in each cycle. The pipeline has two stages: the first includes multiplication and control, and the second includes accumulation. The two-staged pipeline increases latency by a cycle but does not affect throughput. Table II describes the hardware configuration.

Power and energy. We estimate power consumption using a synthetic testbench that simulates different SA utilizations. A utilized PE is defined as a PE with a working MAC unit in any capacity, that is, both operands of at least one input pair are not equal to zero. To meet a certain utilization operating point, the testbenches zero out the activations at a probability corresponding to a configured utilization. Activations, rather than weights, are zeroed out, since weights are usually non-zero (when not considering pruning). The testbenches are used to produce value change dumps (VCDs) that are eventually used to estimate the power of the different SAs.

To estimate energy consumption, we use our PyTorch-based simulator to extract average utilization per layer from each CNN model. Given the average power of layer l, Pi, we calculate the energy consumed by layer l as follows:

$$E_l = \frac{MAC_l}{\text{Throughput}} \cdot P_l, \quad (6)$$

where $MAC_l$ is the number of MAC operations in layer l. The total model energy is the sum over all layers (L): $E=\Sigma_{l=1}^{L} E_l$. Our evaluation shows that SySMT saves an average of 33% and 35% energy when executing the five CNNs with 2 and 4 threads, respectively.

A 2T SySMT does not consume twice the power of a conventional SA. For example, we estimate that a conventional SA and a 2T SySMT consume 277 mW @40% utilization and 429 mW @80% utilization, respectively. Assuming that two threads increase utilization by exactly 2×, the power increase is 1.5× (429 mW @80% divided by 277 mW @40%). Since the 2T SySMT has a constant speedup of 2× over the conventional SA, energy is reduced. Energy is further reduced when actual utilization is not doubled or quadrupled, in which case the number of effective MAC operations is reduced.

I. Experimental Results

Figure 7:
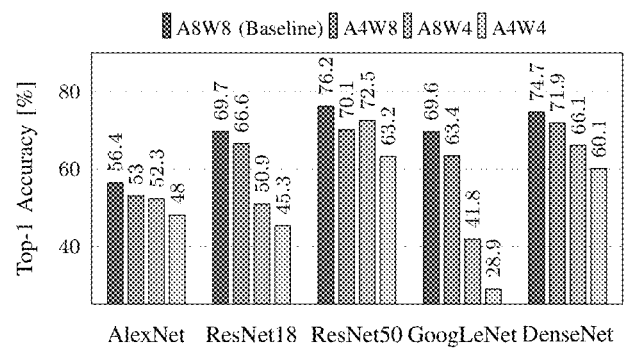
FIG. 7 illustrates an example of Model robustness to on-the-fly numerical precision reduction of the entire model.

Model robustness. During inference, SySMT reduces the precision of parts of the computations to 4 bits. Precision reduction is conducted on-the-fly without variance and bias corrections, which are common in pure quantization mechanisms. We consider a model as more robust than another if it achieves better accuracy given a decrease in its activations and weights representation. A model whose entire representation was reduced from 8b activations and weights (A8W8) to, for example, 4b activations and 8b weights (A4W8) is equivalent to the worst-case scenario for a 2T SySMT. It may, therefore, be considered as the lower accuracy boundary for the 2-threaded implementation. FIG. 7 illustrates model robustness to further quantization of the entire model given an A8W8 baseline. For example, an 8b-8b GoogLeNet whose activations are further quantized to 4 bits incurs a 6.2% accuracy drop. We observe that besides ResNet-50, all models are more robust to quantization of their activations rather than their weights. Therefore, when it is necessary to reduce threads precision, we prefer SySMT to further quantize its activations; we only consider further weight quantization for two-thread collisions with ResNet-50.

2T SySMT: sparsity and data-width. NB-SMT exploits 8-bit and 4-bit input sparsity to mitigate noise involved in "squeezing" threads into a shared MAC unit. Table III presents the impact of independently exploiting sparsity (8-bit) and data-width (4-bit) on the different CNN models, given a 2T SySMT. We denote the different options as follows:

S: exploiting 8-bit sparsity, as illustrated in FIG. 2b.

A (W): exploiting activation (weight) data-width (4-bit) and reducing their precision on-demand, as illustrated in FIG. 2c.

Aw (aW): exploiting activation and weight data-width (4-bit) and reducing activation (weight) precision on-demand, as illustrated in FIG. 2d.

As expected, the combination of exploiting sparsity and data-width variability (S+A and S+W) achieves the best results. Exploiting both activation and weight sparsity (S+Aw and S+aW) does not, however, yield significant or consistent improvement in accuracy. Therefore, throughout this evaluation we exploit either S+A (for all models) or S+W for ResNet-50.

TABLE III

Contribution of exploiting sparsity and/or data-width variability
to CNNs' top-1 accuracy with a 2T SySMT and without reordering.

| | A8W8 | min | A8W8 SySMT | | | | |
|---|---|---|---|---|---|---|---|
| | | | S | A | Aw | S + A | S + Aw |
| AlexNet | 56.36 | 53.03 | 54.52 | 56.04 | 56.05 | 56.21 | 56.22 |
| ResNet-18 | 69.70 | 66.59 | 67.86 | 67.60 | 67.66 | 68.49 | 68.38 |
| GoogLeNet | 69.63 | 63.42 | 66.09 | 65.37 | 65.46 | 67.45 | 67.34 |
| DenseNet-121 | 74.66 | 71.94 | 73.45 | 73.00 | 73.23 | 74.05 | 73.87 |

| | A8W8 | min | A8W8 SySMT | | | | |
|---|---|---|---|---|---|---|---|
| | | | S | W | aW | S + W | S + aW |
| ResNet-50 | 76.24 | 72.49 | 74.36 | 72.36 | 73.00 | 75.10 | 75.22 |

Figure 8:
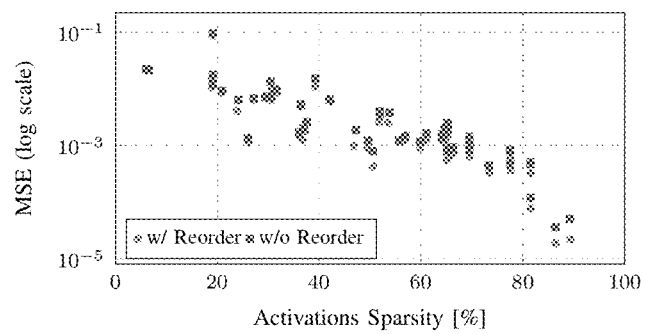
FIG. 8 illustrates an example of GoogLeNet MSE due to 2T SySMT as a function of sparsity. Each dot represents a layer.

2T SySMT: mean squared error (MSE). Since GoogLeNet is the one model that exhibits an accuracy drop of more than 1% (2.18%), we examine its per-layer MSE due to on-demand precision reduction. That is, for each layer we compute the MSE between its output, with and without NB-SMT (without NB-SMT is considered error-free). FIG. 8 presents the MSE versus the activations sparsity for each GoogLeNet layer, with and without reordering. MSE and sparsity are correlated, since less sparsity means that more thread collisions occur, and vice versa.

First, we observe that activation reordering decreases the MSE of all layers in GoogLeNet by avoiding thread collisions. As for classification accuracy, reordering increases the accuracy of ResNet-18, ResNet-50, GoogLeNet, and DenseNet-121 by 0.64%, 0.24%, 0.49%, and 0.35%, respectively. Insignificant improvement was recorded in AlexNet.

Second, MSE differs between layers. SySMT is tunable, and specific layers can be executed with one thread and therefore be error-free. By doing so, we can trade speedup for accuracy. To increase GoogLeNet accuracy so as to meet, for example, a 1% accuracy degradation cap, we execute GoogLeNet without the layer that exhibits the highest MSE. Since that layer had an insignificant number of MAC operations relative to the rest of the model, we achieve a speedup of 1.98× with a 69.25% accuracy—a 0.38% degradation from the A8W8 baseline.

Accuracy comparison. A 2T SySMT enables 8b-8b computations with occasional precision reduction to 4b-8b, which, in a sense, is equivalent to a 4b-8b quantized model. On the one hand, SySMT is capable of maintaining some of the 8-bit computations, thereby reducing some noise. On the other hand, precision reduction is conducted on-the-fly, and SySMT lacks the careful quantization parameter adjustments that post-training quantization techniques perform. We compare 2T SySMT accuracy results to two state-of-the-art post-training quantization methods (Table IV). ACIQ limits the range of the model tensor values by approximating the optimal clipping value analytically from its distribution; and LBQ proposes an optimization framework to find an optimal quantization parameters of each layer. SySMT outperforms both ACIQ and LBQ methods in the 4b-8b scenario. In addition, we expect even less impact on accuracy if weight pruning is considered, as we

TABLE IV

Accuracy comparison of a 2T SySMT
(with reordering) versus LBQ and ACIQ.
The relative degradation from the relevant FP32
baseline is presented in the round brackets. The input layers
are not quantized. GoogLeNet was not tested by any of
the two comparison methods.

| | A/W | SySMT | LBQ | ACIQ |
|---|---|---|---|---|
| AlexNet | 4/8 | 56.23 (−0.32) | 55.51 (−1.12) | 52.30 (−4.32) |
| ResNet-18 | 4/8 | 69.13 (−0.63) | 68.32 (−1.33) | 68.00 (−1.76) |
| ResNet-50 | 8/4 | 75.34 (−0.81) | 74.98 (−1.03) | 75.30 (−0.85) |
| DenseNet-121 | 4/8 | 74.40 (−0.25) | 72.31 (−2.16) | — | later demonstrate with a 4T SySMT.

2T SySMT: utilization. We expect the improvement in utilization and sparsity to be correlated. Low sparsity means relatively little utilization improvement, since utilization was originally high. High sparsity means relatively high utilization improvement, since SySMT is capable of "weaving" the two threads without collisions. FIG. 9 presents the utilization improvement of a 2T SySMT over a conventional SA, with and without reordering, for GoogLeNet as a function of activation sparsity.

The linear trend is somewhat expected. Consider a single PE, T threads, and inputs $x_i$ and $w_i$ where i is the thread number. Assume $r_i$ is the probability of $x_i$ to be non-zero and that $w_i$ is always non-zero. Therefore $$\Pr(\text{utilized PE}) = \Pr(\exists i, x_i w_i \neq 0)$$

$$= 1 - \Pr(\forall i, x_i w_i = 0)$$

$$= 1 - \Pi_{i=0}^{T}(1 - \Pr(x_i w_i \neq 0)) \quad (7)$$

$$= 1 - \Pi_{i=0}^{T}(1 - r_i).$$

For simplicity's sake, we assume all probabilities $r_i$ are equal and that all PEs act the same, so that the PE array utilization is approximately the same as that of a single PE. Utilization improvement of two threads over one thread may, therefore, be formulated as follows:

$$\text{Utilization Gain} = \frac{1 - (1-r)^2}{1 - (1-r)} = s + 1, \quad (8)$$

where $s = (1-r)$ is the sparsity. This result, which is a simple linear curve, is in a good agreement with our measurements (FIG. 9). Reordering increases utilization of SySMT, since it trades thread collisions with no collisions, thereby increasing utilization while reducing error. Utilization measurements with reordering are above the analytical line of Eq. 8, since the assumption of thread independence does not hold then.

Interestingly, even though utilization is not doubled, a 2T SySMT still achieves 2× performance. The mismatch between utilization improvement and performance speedup is due to the PEs' ability to momentarily operate on two low-precision inputs in one cycle by sacrificing some accuracy.

TABLE V

4T SySMT accuracy and speedup with one (1L) and two (2L) layers set to execute at 2T. LBQ also treats layers with high MSE differently.

| | 4T SySMT | | | |
|---|---|---|---|---|
| | 4T | 1L@2T | 2L@2T | LBQ |
| AlexNet | 53.65 (4×) | 56.02 (2.9×) | — | 54.48 |
| ResNet-18 | 64.32 (4×) | 66.08 (3.7×) | 67.98 (3.5×) | 67.42 |
| ResNet-50 | 70.79 (4×) | 71.96 (3.9×) | 72.72 (3.9×) | 72.60 |
| GoogLeNet | 60.00 (4×) | 64.47 (3.9×) | 64.83 (3.9×) | — |
| DenseNet-121 | 72.41 (4×) | 72.5 (3.8×) | 72.82 (3.7×) | 71.56 |

2T SySMT: MLPerf. MLPerf is becoming a standard as a machine learning benchmark in both academia and industry. We evaluated SySMT with ResNet-50 and MobileNet-v1 checkpoints provided by the MLPerf inference benchmark suite. ResNet-50 achieves FP32 and 8-bit (with batch-norm running mean and variance recalibration) top-1 accuracy of 76.46% and 76.42%, respectively. To meet ResNet-50 quality target of 99% defined by MLPerf, we execute two high MSE layers with one thread. By doing so, a 2T SySMT achieves a speedup of 1.97× with top-1 accuracy of 75.81%. MobileNet-v1 comprises blocks of depthwise convolutions followed by pointwise convolutions. Since the pointwise convolutions are the bulk of MobileNet-v1 operations, they are executed with two threads, whereas the depthwise convolutions are executed with one thread. MobileNet-v1 achieves FP32 and 8-bit top-1 accuracy of 71.68% and 71.41%, respectively. Using a 2T SySMT, we achieve a speedup of 1.94× with top-1 accuracy of 70.68%, which meets the MLPerf MobileNet-v1 quality target of 98%.

4T SySMT: accuracy comparison. As opposed to a 2T SySMT, thread collisions are more likely to occur in a 4T SySMT. Moreover, thread collision of three or four threads results in the precision reduction of all activations and weights, leading to additional noise. We therefore examine SySMT operating points, in which some layers execute with two threads instead of four threads, thereby decreasing the noise they contribute during inference. Layers chosen to be slowed down are those with the highest recorded MSE. If different layers exhibit approximately the same MSE, we choose to first slowdown those located at the beginning of the network. Table V presents results for a 4T SySMT and compares them with those of LBQ. We do not compare our results to those of ACIQ, since ACIQ quantizes its 4-bit activations per-channel, which is not trivial to be implemented in hardware. It is worth mentioning that LBQ also considers that some layers exhibit high MSEs and therefore should be treated differently. For example, LBQ quadruples the number of 4-bit computations in 23.8% of ResNet-18 layers to achieve their 4-bit results. We observe that a 4T SySMT achieves competitive results compared with LBQ with only minor algorithmic pre-processing (gathering min-max statistics versus finding an optimal solution to an optimization problem). Moreover, SySMT is expected to achieve even higher results if pruning is considered.

4T SySMT: weights pruning. SySMT exploits unstructured sparsity in both activations and weights. Yet, conventional DNN training with only a loss function (i.e., no regularization terms) produces weights that do not comprise many zeros. Different techniques have, therefore, emerged to increase weight sparsity either through regularization, e.g. L1, or by iteratively removing weights and retraining the model to compensate for the degradation in accuracy. SySMT benefits from sparse inputs, since more zeros means less thread collisions.

FIG. 10 presents ResNet-18 accuracy for different percentages of pruned weights (e.g., 20% means that 20% of weights are equal to zero). As before, we trade speedup for accuracy by slowing down layers to run with two threads. We observe that with a speedup of 4×, the 60%-pruned model achieves highest accuracy. However, as speedup decreases (i.e., as more layers are slowed down), the most pruned model achieves lowest accuracy. This stems from the fact that the 60%-pruned model has the lowest baseline accuracy, that is, accuracy of the 60%-pruned model without SySMT is 68.8%, 0.9% below that of original 8-bit model. Therefore, there is a trade-off between how much accuracy is achieved from avoiding thread collisions thanks to pruning and the potential of the baseline pruned model.

The method in which we set layers from four threads to two threads may not be the most efficient way in terms of accuracy gains to speedup loss. A different mixture of layers that are set to run with two threads may possibly yield better speedup with better accuracy than those presented in FIG. 10. We leave this, however, for future work.

Applying NB-SMT in other accelerators. The concept of NB-SMT may be beneficial in accelerators other than OS-SAs. Google's TPU is a good candidate, since it is based on an SA core. However, since TPUv2 comprises FP units in its matrix unit, an NB-SMT solution for FP units is necessary. With a FP-based core, we expect the relative NB-SMT overheads to be smaller than those in SySMT.

Eyeriss is a 16-bit fixed-point accelerator designated for CNNs. It exploits the reuse inherent in the convolution operations with a dataflow scheme named row stationary. Each PE within Eyeriss is capable of executing multiple 2D convolutions in an interleaved fashion. Instead of interleaving the data, NB-SMT may be used to execute convolution flows in parallel. We expect the relative overhead of NB-SMT to be smaller than that of SySMT, since Eyeriss's PEs are 16-bit, they consist of three pipeline stages, and they have more memory.

DaDianNao is largely a pipelined version of the basic computations involved in DNNs, which are multiplications, additions, and activation functions. The multipliers in the first pipeline stage may be shared and serve several threads, as long as each multiplier does not contribute to different output activations (i.e., psum sharing). Otherwise, multipliers will need to dynamically propagate their results to the appropriate adder tree as a function of the input values.

SnaPEA is an architecture with early activation prediction. Each PE within SnaPEA comprises compute lanes, and each compute lane is responsible for the computation of a single output activation. Conceptually, an NB-SMT-enabled SnaPEA may increase compute lane utilization when a thread is predicted to be negative. In addition, SnaPEA pre-processing phase may also take NB-SMT into consideration, thereby reducing its impact on accuracy.

Exploiting sparsity. Sparsity has long been a DNN characteristic exploited in different manners in hardware to achieve performance, power, and energy savings. (1) Exploiting sparsity with dedicated hardware that operates on compressed encodings, such as SparTen, Cambricon-S, SCNN, EIE, and SpArch; (2) Predicting whether certain activations in the layer's output are zero-valued and their computation can be, therefore, skipped. Prediction must be low-cost relative to the original activation computation and can be based on partial computation of the predicted activation, on spatially adjacent fully computed activations, and on input activations, for example; (3) Skipping over zero-valued input activations and weights, which can be further enhanced by skipping over zero-valued bits; and (4) Actively fine-tuning the DNN parameters to better fit the hardware architecture. In this paper, we introduce NB-SMT—an additional strategy to exploit unstructured sparsity that has yet to be explored.

Exploiting data-width variability. DNNs can maintain accuracy while altering their numerical precision. Numerical representation may differ between layers and within layers. Proteus and ShapeShifter exploit data-width variability to reduce memory traffic and memory footprint. Stripes exploits precision variability with bit-serial computations; and Bit Fusion is a configurable accelerator capable of DNN execution in different bit-widths. In this paper, we demonstrate NB-SMT with SySMT which exploits data-width variability and DNN tolerance to precision changes in order to "squeeze" several threads to the same execution unit in parallel.

Multitasking. The notion of DNN multitasking has been demonstrated with PREMA and AI-MT. Both papers decrease latency by prioritizing high-priority tasks, increase resource utilization, and increase memory bandwidth utilization with blocking scheduling algorithms. NB-SMT, on the other hand, avoids task blocking by exploiting the resiliency of DNNs, that is, sacrificing computation precision on particular occasions. In addition, the multitasking demonstrated in this paper with SySMT may be considered as taking place in fine granularities of MAC operations.

Deep neural networks (DNNs) involve abundant multiply-and-accumulate (MAC) operations, many of which underutilize the underlying hardware due to particular values. In this paper, we mapped the concept of simultaneous multithreading (SMT), known from CPUs, to hardware designated for DNNs. We show that by considering the input values and by acknowledging that DNNs may endure some perturbations in their MAC results, non-blocking SMT (NB-SMT) can increase hardware utilization and save energy with negligible accuracy degradation. NB-SMT differs from conventional SMT as it does not stall threads on structural hazards. Instead, NB-SMT "squeezes" threads to the shared resources when a structural hazard occurs, taking advantage of DNN resiliency and enabling the implementation of multithreading even in rigid structures such as systolic arrays (SAs). We implement NB-SMT as an extension to an SA, which we name SySMT, and evaluate its impact on five popular CNN architectures as well as its area, power, and energy. For example, compared with a conventional SA, a 2-threaded SySMT consumes 1.4× the area and delivers a 2× speedup with 33% energy savings with less than 1% accuracy degradation.

Figure 11:
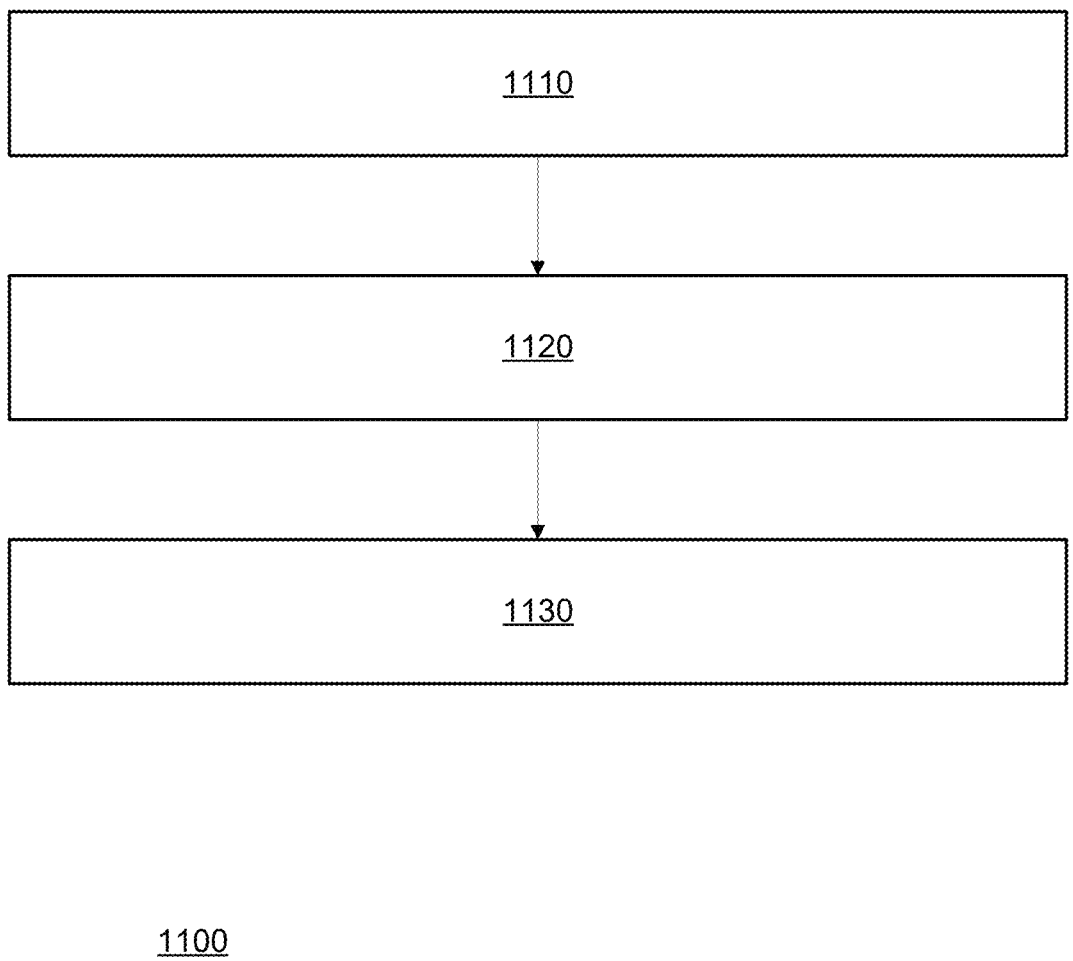

FIG. 11 illustrates method 1100 for for non-blocking multithreading.

Method 1100 may start by step 1110 of providing, during a deep neural network (DNN) calculation iteration, to a shared computational resource, input information units related to multiple DNN threads.

Step 1110 may be followed by step 1120 of determining whether to reduce a numerical precision of one or more DNN calculations related to at least one of the multiple DNN threads.

Step 1120 may be followed by step 1130 of executing, based on the determining, DNN calculations on at least some of the input information units to provide one or more results of the DNN processing.

Step 1120 maybe based on a capacity of the shared computational resource and on values of the input information units.

Step 1120 may include searching, based on the values of the input information units, for one or more unnecessary DNN calculations and for one or more necessary DNN calculations, and checking whether the capacity of the shared computational resource is sufficient for performing all necessary DNN calculations within the DNN calculation iteration without reducing the numerical precision.

Step 1120 may include reducing, When the capacity is not sufficient, the numerical precision.

Step 1120 may include avoiding, when the capacity is sufficient, from reducing the numerical precision.

Step 1120 may include skipping an executing of the one or more unnecessary DNN calculations.

Step 1120 may include defining a multiplication of a zero-valued input information unit as an unnecessary DNN calculation.

Step 1120 may be based on input information units sparsity.

Step 1100 may include applying a selective precision reduction process, the selective precision reduction process is based on step 1129 of determining of whether to reduce the numerical precision.

Step 1130 may include performing multiplications by one or more flexible multiplier units configured to conducting different precision multiplications on demand.

The multiple DNN threads may be independent DNN threads. Independent—not dependent on each other.

The multiple DNN threads may originate from a same execution flow. The shared computational resource may include a shared partial sum register.

Figure 12:
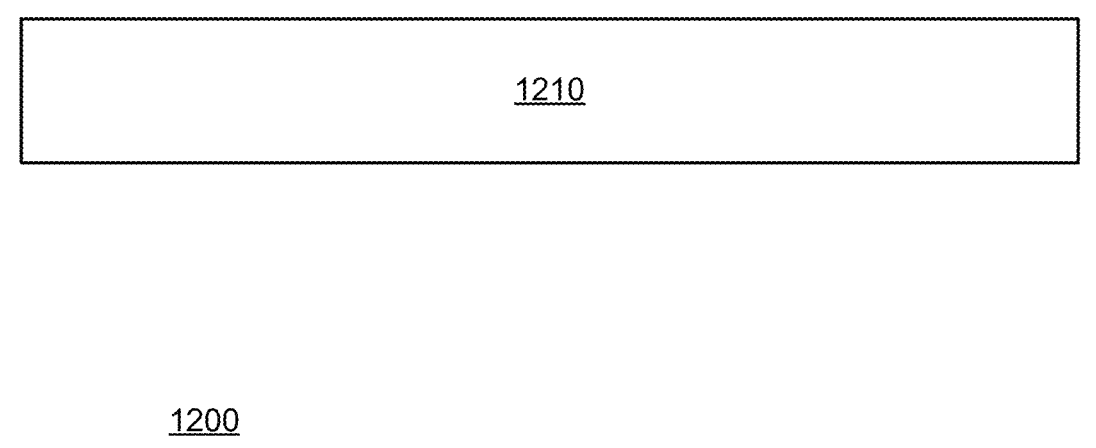

FIG. 12 illustrates method 1200 for for non-blocking multithreading. Method 1200 may include step 1210 of executing, in parallel, multiple deep neural network (DNN) threads by a shared computational resource. Step 1210 may include performing DNN calculations and reducing a numerical precision of at least one of the DNN calculations when a threads collision occurs.

Figure 13:
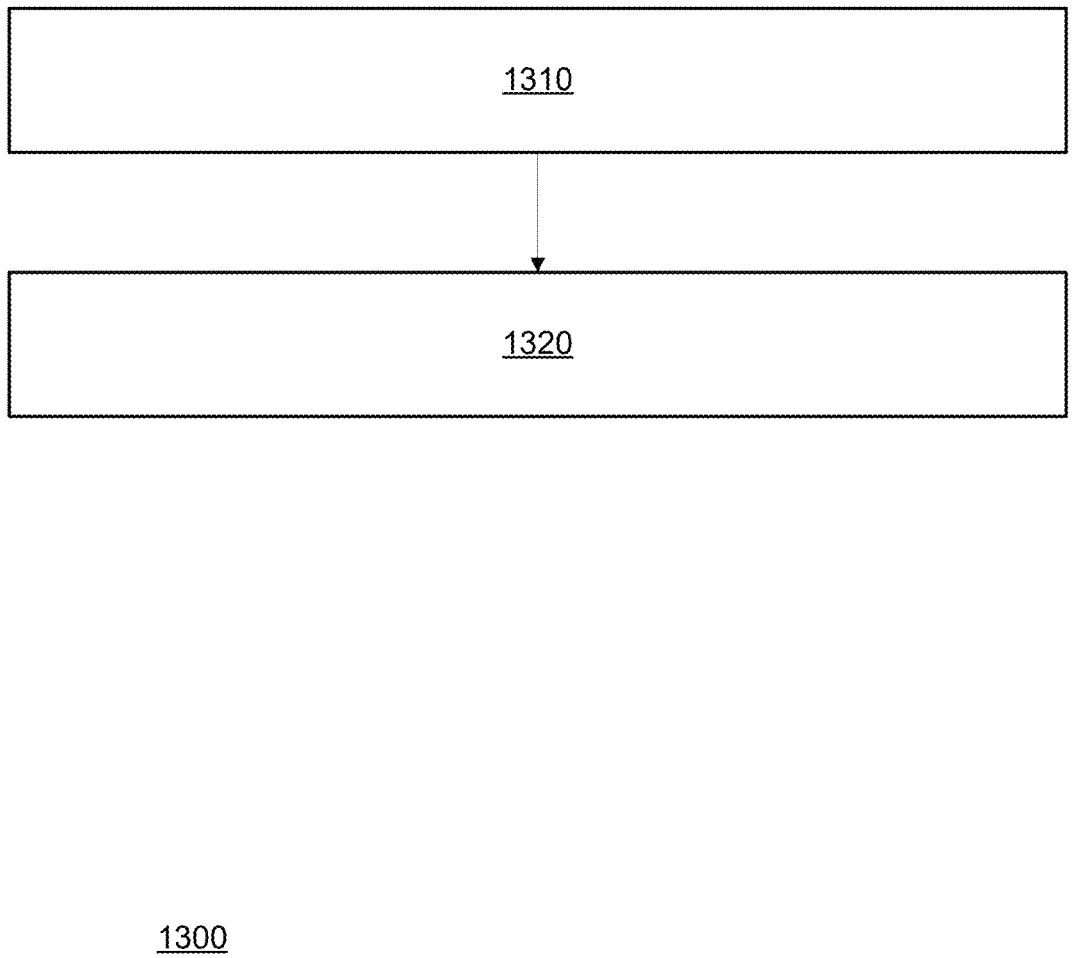

FIG. 13 illustrates method 1300 for for non-blocking multithreading. Method 1300 may include step 1310 of providing, during a deep neural network (DNN) calculation iteration, to a shared computational resource, input information units related to multiple DNN threads. Step 1310 may be followed by step 1320 of exploiting a resiliency of the multiple DNN threads to execute the multiple DNN threads in a not blocking manner.

Step 1320 may include determining whether to reduce a numerical precision of one or more DNN calculations related to at least one of the multiple DNN threads, and executing, based on the determining, DNN calculations on at least some of the input information units to provide one or more results of the DNN processing.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one.

Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method non-blocking multithreading related to a deep neural network (DNN), the method comprises:
    (a) providing, during a DNN calculation iteration, to a shared computational resource, input information units related to multiple DNN threads;
    (b) determining whether to reduce a numerical precision from a first precision value to a second precision value, of one or more DNN calculations related to at least one of the multiple DNN threads,
    wherein the determining is based on a capacity of the shared computational resource and on input information units sparsity; and
    (c) executing, based on the determining, DNN calculations on at least some of the input information units to provide one or more results of the DNN processing, wherein the DNN calculations comprise multiplications: wherein the DNN calculations are executed by multiple DNN layers of the DNN; wherein for each DNN layer of the multiple DNN layers, a DNN layer output is rearranged before being sent to a next DNN layer so that according to statistics related to precisions of activation values associated with the DNN layer;
    (i) an activation value of the first precision of a first DNN thread is paired with a zero-valued activation of a second DNN thread; and
    (ii) an activation value of the second precision of the first DNN thread is paired with an activation value of the second precision of the second DNN thread.

2. The method according to claim 1 wherein the determining comprises searching, based on values of the input information units, for one or more unnecessary DNN calculations and for one or more necessary DNN calculations, and checking whether the capacity of the shared computational resource is sufficient for performing all necessary DNN calculations within the DNN calculation iteration without reducing the numerical precision.

3. The method according to claim 2 wherein when the capacity is not sufficient then reducing the numerical precision.

4. The method according to claim 2 wherein when the capacity is sufficient then avoiding from reducing the numerical precision.

5. The method according to claim 2 wherein the executing comprises skipping an executing of the one or more unnecessary DNN calculations.

6. The method according to claim 2 comprising defining a multiplication of a zero-valued input information unit as an unnecessary DNN calculation.

7. The method according to claim 1 wherein the execution comprises applying a selective precision reduction process, the selective precision reduction process is based on the determining of whether to reduce the numerical precision.

8. The method according to claim 1 wherein executing comprises performing the multiplications by one or more flexible multiplier units configured to conducting different precision multiplications on demand.

9. The method according to claim 1 wherein the multiple DNN threads are independent DNN threads.

10. The method according to claim 1 wherein the multiple DNN threads originate from a same execution flow.

11. The method according to claim 10 wherein the shared computational resource comprises a shared partial sum register.

12. The method according to claim 1, comprising performing column-granularity reordering of weight and activation matrices of one or more layers of the DNN.

13. The method according to claim 12, wherein the column-granularity reordering are based on pre-layer statistics.

14. A non-blocking multi-threading processing unit related to a deep neural network (DNN), comprising
a controller and a shared computational resource, the shared computational resource comprises a hardware multiply-and-accumulate unit and is configured to receive during a deep neural network (DNN) calculation iteration, input information units related to multiple DNN threads; the controller is configured to determine whether to reduce a numerical precision of one or more DNN calculations related to at least one of the multiple DNN threads, wherein the determining is based on a capacity of the shared computational resource and on input information units sparsity; and wherein the shared computational resource is configured to execute, based on the determining, DNN calculations on at least some of the input information units to provide one or more results of the DNN processing wherein the DNN calculations comprise multiplications; wherein the DNN calculations are executed by multiple DNN layers of the DNN, wherein for each DNN layer of the multiple DNN layers, a DNN layer output is rearranged before being sent to a next DNN layer so that according to statistics related to precisions of activation values associated with the DNN layer;
(i) an activation value of the first precision of a first DNN thread is paired with a zero-valued activation of a second DNN thread; and
(ii) an activation value of the second precision of the first DNN thread is paired with an activation value of the second precision of the second DNN thread.

15. The non-blocking multi-threading processing unit according to claim 14 wherein the controller is configured to search, based on values of the input information units, for one or more unnecessary DNN calculations and for one or more necessary DNN calculations, and check whether the capacity of the shared computational resource is sufficient for performing all necessary DNN calculations within the DNN calculation iteration without reducing the numerical precision.

16. The non-blocking multi-threading processing unit according to claim 15 wherein when the capacity is not sufficient then reducing the numerical precision.

17. The non-blocking multi-threading processing unit according to claim 15 wherein when the capacity is sufficient then avoiding from reducing the numerical precision.

18. The non-blocking multi-threading processing unit according to claim 15 wherein the shared computational resource is configured to skip an executing of the one or more unnecessary DNN calculations.

19. The non-blocking multi-threading processing unit according to claim 15 wherein the controller is configured to define a multiplication of a zero-valued input information unit as an unnecessary DNN calculation.

20. The non-blocking multi-threading processing unit according to claim 14 wherein the shared computational resource is configured to apply a selective precision reduction process, the selective precision reduction process is based on the determining of whether to reduce the numerical precision.

21. The non-blocking multi-threading processing unit according to claim 14 wherein the shared computational resource is configured to perform multiplications by one or more flexible multiplier units configured to conducting different precision multiplications on demand.

22. The non-blocking multi-threading processing unit according to claim 14 wherein the multiple DNN threads are independent DNN threads.

23. The non-blocking multi-threading processing unit according to claim 14 wherein the multiple DNN threads originate from a same execution flow.

* * * * *